(12) United States Patent
Wajda

(10) Patent No.: US 12,504,001 B2
(45) Date of Patent: Dec. 23, 2025

(54) SOLAR WIND TURBINE WITH LEVER ASSIST VIA COMPOUNDING MECHANICAL ADVANTAGE

(71) Applicant: Robert G Wajda, Jacksonville, FL (US)

(72) Inventor: Robert G Wajda, Jacksonville, FL (US)

(*) Notice: Subject to any disclaimer, the term of this patent is extended or adjusted under 35 U.S.C. 154(b) by 0 days.

(21) Appl. No.: 19/016,453

(22) Filed: Jan. 10, 2025

(65) Prior Publication Data

US 2025/0146472 A1    May 8, 2025

Related U.S. Application Data

(63) Continuation-in-part of application No. 18/234,467, filed on Aug. 16, 2023, now abandoned.

(51) Int. Cl.
*F03D 9/00* (2016.01)
*F03D 9/25* (2016.01)

(52) U.S. Cl.
CPC ............ *F03D 9/007* (2013.01); *F03D 9/25* (2016.05); *F05B 2220/708* (2013.01)

(58) Field of Classification Search
CPC ....... F03D 9/007; F03D 9/25; F05B 2220/708
See application file for complete search history.

(56) References Cited

U.S. PATENT DOCUMENTS

| | | | |
|---|---|---|---|
| 10,724,503 B2 * | 7/2020 | Al-Qanaei | F03D 13/20 |
| 2018/0023547 A1 * | 1/2018 | Jeffus | F03D 9/25 |
| | | | 290/44 |

* cited by examiner

*Primary Examiner* — Viet P Nguyen

(57) ABSTRACT

The Solar Wind Turbine with Lever Assist via Compounded Mechanical Advantage is an innovation that allows energy-producing turbines to operate in all geographic regions of the world. Designed to reduce greenhouse emissions, the novelty of the proposed apparatus accommodates aerodynamically positioned ducted fans with included velocity-sensing pitot tubes perpendicular to the distal ends of the extension arms. The extension arms are further contributed into mechanical levers which applies additional torque to the central rotating fulcrum. Complementing established turbine models, this technology will produce stronger outputs of green energy while expanding the geographic regions where they can be operated at full capacity. Further, this downward force in combination with extending lever arms creates mechanical advantage for each lever which compounds the total output torque placed on the central rotating fulcrum. When you add more extendable lever arms, it compounds mechanical advantage by means of the law of the lever.

1 Claim, 9 Drawing Sheets

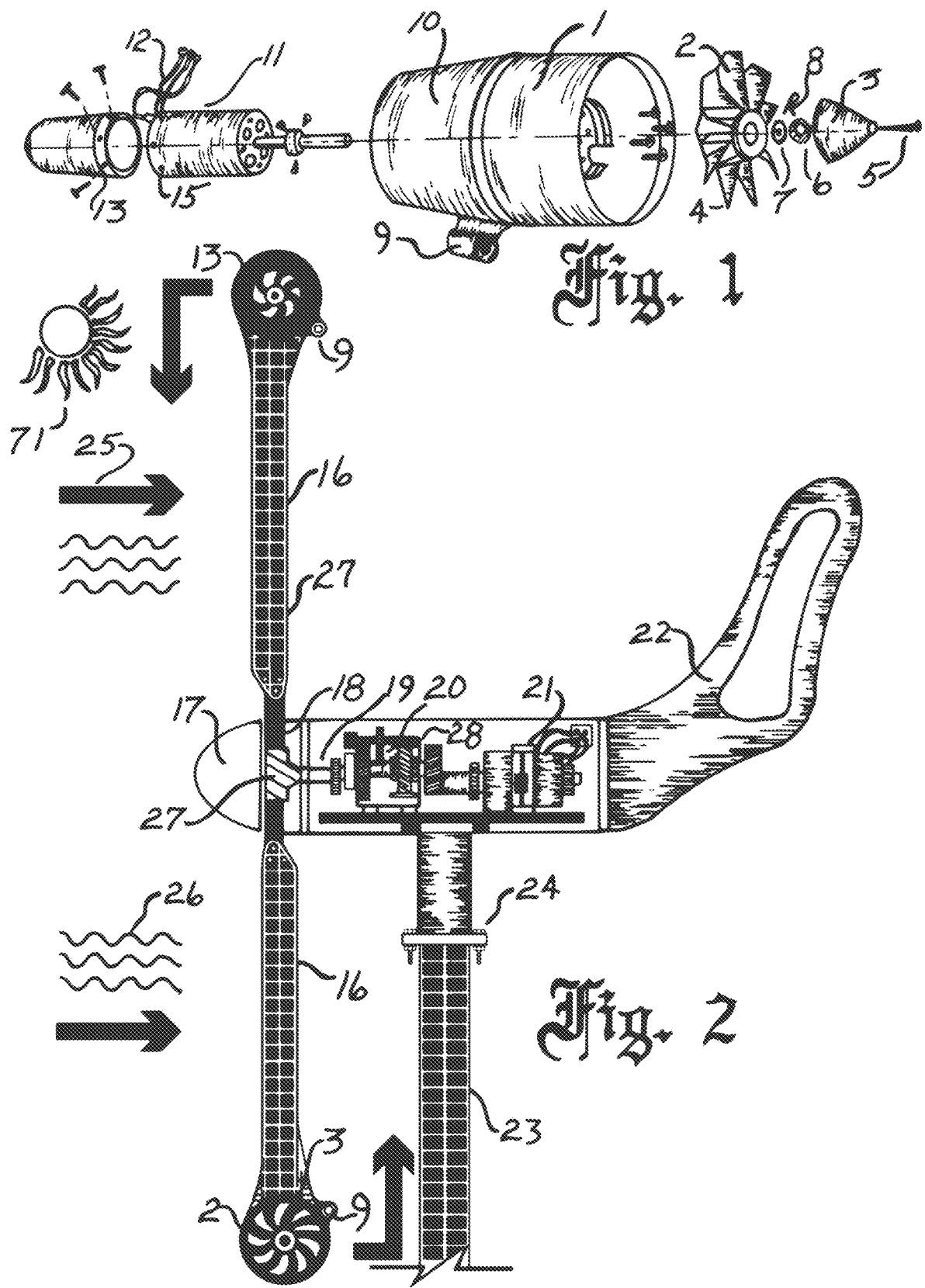

SOLAR WIND TURBINE WITH LEVER ASSIST VIA COMPOUNDING MECHANICAL ADVANTAGE

CROSS-REFERENCE TO RELATED APPLICATIONS

This application is a continuation in part of Ser. No. 63/419,763 filed 2022 Oct. 27 This application is a continuation in part of Ser. No. 18/234,467 filed 2023 Aug. 16

BACKGROUND

Field of the Invention

The present invention relates in general to the systems and methods for creating electrical energy from lever-assisted turbines with attached retractable machine-driven blade arm. In particular, the design allows the performance of a unique compounding mechanical advantage to take place that optimizes solar energy by adaption to powered ducted fans. These fans produce a downward force that is applied to the distal ends of multiple levers simultaneously which compounds the mechanical advantage of the apparatus altogether.

Changing how solar cells are incorporated into the wind turbine system's exterior and how they are used to produce sufficient power for rotational purposes, allows the apparatus to operate more efficiently by increasing torque by means of an introduction of compounding mechanical advantage with said downward force being simultaneously applied with a multiple lever system.

The novel features include ducted fans with attached pitot tubes, lever assistance, implements designed for conventional turbine conversion, solar rotating discs, extractable extension rods, rear instrument housing, and wireless electromagnetic connections.

DESCRIPTION OF THE PRIOR ART

Example embodiments that relate to wind turbines and solar panel combinations have been previously published beginning in the late 1800s. Early wind turbine models were initially used to grind flour using captured wind energy to spin blades and turn a pulley that enabled a mechanical function to grind grain. This procedure was revolutionary because of the invaluable time that was saved from the manual labor that was typical of the task. Mechanically, current wind turbines work similarly to those designed in the 1800s.

Solar panels were invented by Charles Fritts in 1883. The first editions were coated with a thin layer of selenium and gold. This combination of elements yielded an electrical efficiency rate of 1%. Modern solar panels yield an increased rate of approximately 22%. Efficiency improvements with silicon-based solar cells have provided minimal advancement since the introduction of the first solar panel in 1883.

Using wind and solar harnessing techniques is not considered a novel combination. The conceptualized idea concerning the novel invention concludes that limited to no wind is needed to power the present invention itself. An incremental amount of energy is derived from the solar cells to power the ducted fans, which in return launches a series of mechanical tasks that demonstrates the novel approach of compounded mechanical advantage using lever assistance from multiple wind fan blades or steel extension rods.

Modern wind turbine systems use a three-blade design that provides the least amount of resistance to the flow of wind. This creates the anticipated spinning motion of the wind turbine to always stay constant, allowing the turbine to smoothly rotate.

While modern wind turbines have been increasing in model size and scope, the design concept versus energy output correlation is not practical for residential and commercial consumer energy usage. Wind turbines use the earth's natural resource of wind. If no wind is present, the turbines will not spin. Likewise, if no sun is present, the solar cells have no energy to harvest.

The mechanical function of current wind turbine models displays nominal results at best to produce electricity that provides the community a return on investment or consequentially serves the intended purpose of helping the environment.

The present invention contradicts previous assumptions that wind turbines are engineered for peak performance regarding the methods of harvesting the natural energy of the wind resource. The said design functions incorporate current wind and sun harvesting methods with a novel feature of lever assistance that allows the totality of compounded mechanical advantage to be achieved as envisioned and described below.

US 2018/0023547-A1 published Jan. 25, 2018, to Jeffus; Larry discloses an electrical power may be generated by a system employing wind and solar energy capturing means. This invention is a dual source application that takes in solar and wind but does not use any source by itself or in combination that compounds mechanical advantage.

U.S. patent Ser. No. 10/724,503-B2 issued July 2020 by Ahmad Abdallah Al-Jassem Al-Qanaei discloses a system for generating its own air currents to run electric turbines. The system includes: a vertical tower or support provided with a rotating disk at its upper end, up to four laterally extending arms connected to the disk, each arm carrying a wind turbine generator with rotating blades/rotors attached at its outer end. As in the prior art above, the disclosed inventions use a dual source application. For instance, it uses wind to rotate and additional wind that spins the turbines which adds small amounts of electrical power to the entire unit.

In all references, the above inventions focus on combining solar, wind, and/or turbines to increase total output power whereas Wajda's invention only uses various combinations as an alternate power source for the downward thrust mechanism. For instance, Wajda's invention is distinct in presenting the novelty of a lever-based system solely focusing on compounding mechanical advantage by means of extracting the lever arms while using the tilted ducted fans as a thrust mechanism to create a downward force. No additional amount of electrical power is added to the entire unit at this point.

Instead, the alternate power source, whether it be solar, battery, electric, or any other source is used specifically to power the ducted fans which create the downward force at the distal end of each turbine arm. Further, this downward force in combination with extending lever arms creates a mechanical advantage for each lever which compounds the total output torque pivoting on the central rotating fulcrum. When adding extendable lever arms, it compounds mechanical advantage by means of the 'law of the lever'. None of the above inventions and patents, taken in singly or in combination, is seen to describe the instant invention as claimed.

SUMMARY OF THE INVENTION

The Solar Wind Turbine with Lever Assist via Compounding Mechanical Advantage is a novel innovation that could revolutionize the way wind turbines of the future are constructed and engineered by maximizing efficiency of produced electricity. Adding enhanced efficiency ratings throughout all geographic regions within the United States and the world at large would provide substantial alleviation to the multitude of electrical grid infrastructures that draw in this additional power to be dispersed accordingly across the power framework. The newly incorporated lever assist within the confines of this innovation provides a unique compounded mechanical advantage that will contribute to a plurality of designs consistent with the systems' ability to function in harsh drier climates that produce little to no wind such as deserts.

One feature of a specific model built for these harsher desert climates will include an engineered design that allows for no wind blades due to their needless value when no wind harvesting is sought. In a pure desert climate where there is little to no rain or wind, the Solar Wind Turbine with Lever Assist will use steel extension rods as levers to further capabilities in which traditional wind turbines would be inferior in such environments.

These extractable extension rods will attach to a rotating assembly that highlights the novel solar rotating disc with incorporated disc solar panels. The extension rods encounter limited resistance that the rotation of the entire assembly generates. They are designed to include attached ducted fans and function as the structural support of the solar rotating disc with a plurality of these extension rods.

Further, conversion kits will be made available which attach to already existing wind turbine assemblies. This is accomplished by removing the prevailing blades and adding said conversion kit. The conversion kit is a novel atypical approach that is intended to replace standard turbine blades that are conventionally known and used on current and early wind turbine models.

The instant invention is designed for personal, residential, commercial, industrial, marine, and United States Military purposes by transitioning a modern wind turbine design into an efficient electrical generator that works in sun-driven environments, wind field zones, or areas more prone to wind, and generally every geographic region of the world where wind turbines cannot or have not been widely used.

By placing ducted fans in aerodynamic key positions with velocity-sensing pitot tubes perpendicular to the wind blade tips of the turbine, the turbine system described above incorporates a plurality of turbine wind blade arms or extension rods into the design. By utilizing compounded mechanical advantage with an incorporated lever system that drives added torque power, less energy is required to produce greater outputs of efficiency.

Archimedes, an ancient Greek mathematician, used geometric reasoning to prove that in normal circumstances a lever is a type of bar that pivots on a fulcrum attached to a fixed point. A fulcrum is a fixed pivotal point where the lever and load meet. This is described as the center of gravity and was the foundation of his theory and formal postulate of 'The Law of The Lever.'

The Solar Wind Turbine with Lever Assist utilizes the very principles of the mentioned law described above to propel the turbine wind blade arms or extension rods themselves. By incorporating a plurality of levers and various internal designs focused on the physics of central gravity and dispersing of the concentrated gathered energy, a compounded mechanical advantage is seen and used as an added asset to produce a higher efficiency by the contributed factor of how many levers are engineered into the design itself.

Each arm of the described solar wind turbine acts as an independent lever simultaneously contributing to the torque of the internal central fulcrum. These solar wind turbine arms (levers) will also be sheathed in solar cells, maximizing all space available on the entire exterior of the system. These features further limit the ground space that is traditionally used for solar panel placement that current installations incorporate into their design.

Present-day wind turbines that use added solar panels, in combination with the wind turbine itself generate limited amounts of additional power with these added features. The Solar Wind Turbine with Lever Assist will only take a small amount of electricity to operate the ducted fans, which is one of the novel approaches to this innovation. Along with the limited power needed to operate the ducted fans themselves, the rotating motion of the turbine will also exist contemporaneously with the internal leverage that the described system proposes according to the use of a plurality of mechanical levers.

This focused energy will also power the onboard electrical ducted fans that are used as the main force that propels this wind turbine design in the rotational pattern that is commonly seen today.

Each arm of the solar wind turbine becomes an independent lever that pivots on the central fulcrum. The specific case this novel innovation holds in this instance provides that the central fulcrum point is also used as a load-bearing electrical generator. Since ducted fans already create thrust, they propel the turbine wind blade arms—the provided lever(s)—from their blade tip position in a downward direction and rotating manner.

The load provided on the central fulcrum also rotates in the same 360° motion as the turbine wind blades. This design is not a stationary lever system that is typically accustomed to engineering practices, but it is indeed a lever system that pivots on a central rotating fulcrum. This works by increasing the distance which the force acts upon. The amount of force needed to move the arms downward decreases as the lever size increases. The total area of solar panels—situated on the exterior of each arm—also increases as the lever arm expands in length and size.

As the turbine lever blades move with a downward force, it rotates the generator on the center fulcrum axis. This gives the entire invention a compounding mechanical advantage with additional torque on each lever arm. This allows an increased electrical output simultaneously. The novel approach of compounded mechanical advantage allows the solar wind turbine to become more efficient the larger it becomes. The farther outward you place the ducted fans on the wind blades or steel extension rods, the less force it takes to rotate and provide said pivot on the central fulcrum.

Objectives

The Instant Invention aims to create a novel global wind turbine that operates efficiently when the wind is not blowing and/or works in harsh environments such as hot desert climates.

An objective of the current invention is to have an internal series of pulleys and levers that allow the said invention to turn in a horizontal or vertical position to match the sun's rays and current wind direction.

Another advantage of the instant invention is to implement conversion kits to replace existing wind turbine designs with wind turbine arms and use extension rods that are connected to a novel solar rotating disc. This configuration limits resistance to the rotation of the entire assembly and is designed to include attached ducted fans and support the structural integrity of the solar rotating disc with a plurality of extension rods. The solar rotating disc also serves to protect the ducted fans from environmental elements.

The novelty of the conversion kit provides an atypical approach that is intended to replace standard wind turbine blades conventionally known and used on current and early wind turbine models.

Another objective of the instant invention is to allow for a system whereas by making the wind turbine arms longer in length, they become easier to turn on its central axis. This is accomplished by converting the turbine arms into levers that pivot on the fulcrum's center axis. As the solar wind turbine arm increases in length, it takes less force to propel the arms in a downward direction. Thus, increasing the electrical output of the main turbine generator with the least amount of resistance.

Yet another objective is for a specific model to be built for harsher desert climates that will include an engineered design that allows for no wind blade(s). This is due to their needless value when no wind harvesting is sought. In a pure desert climate and other environments where little to no rain or wind is present, the Solar Wind Turbine with Lever Assist will use steel extension rods as levers to minimize resistance and provide the structural base to support the solar rotating disc and attachment ability for the ducted fans.

A final objective is to create a solar rotating disc with an array of solar panels in combination with modified wind turbine arms with perpendicular installed ducted fans that connect directly to steel extension rods. The rods connect to the underside of the solar rotating disc assembly that rotates with the turbine and works in combination with its internal generator.

Other objectives and advantages of the various embodiments of the present invention will become obvious to the reader and it is intended that these objects and advantages are within the scope of the present invention.

To the accomplishment of the above and related objects, this invention may be embodied in the form illustrated in the detailed accompanying drawings, attention being called to the fact, however, that the drawings are illustrative only, and that changes May be made in the specific construction illustrated and described within the scope of this application.

Currently, both technologies—wind turbines and solar panels—individually and/or in combination together yield average results and are inefficient without the sun or wind. Solar panels used solely in conjunction with wind turbines have been proven to be limited due to the efficiency standards of these panels producing only lesser amounts of electrical energy based on sun availability and absorption.

The wind turbine(s) built today are only designed to work where adequate amounts of wind are available to provide fan blade and turbine motion assistance. Hence, current wind turbine farms are typically only constructed in geographical areas in which there is a history of consistent wind movement behavior.

The wind turbine has not evolved significantly since its first development and areas around the world with limited wind fields inhibit its efficiency. While the wind turbine industry is focusing on expensive offshore solutions, the present invention's novelty allows this individual wind turbine design to operate efficiently in sun-prone desert climates to provide a more economical and environmentally friendly solution.

A novel concept that allows a solar wind turbine to be operated in conditions that are inclined to have abundant sunshine and low historic wind fields allows the propensity for further turbine industry growth. Geographic regions such as deserts would qualify as areas that support prolonged sunshine weather patterns consistent with lesser wind fields compared to more pronounced places of wind harvesting such as The Great Plains.

This system using laws of physics draws attention to compounding mechanical advantage by lever assistance allowing said innovation to operate efficiently in any worldwide environment while increasing torque on the central fulcrum and using less mechanical energy to optimally function.

Example embodiments will become more fully understood from the detailed description given herein below and the accompanying drawings, wherein like elements are represented by like reference characters, which are given by way of illustration only and thus are not limited to the example embodiments herein.

BRIEF DESCRIPTION OF THE DRAWINGS

FIG. 1 Exploded view of a ducted fan assembly

FIG. 2 Left-side view of the solar wind turbine with lever assist

DETAILED DESCRIPTION OF THE PREFERRED EMBODIMENT

Figures 3, 4:
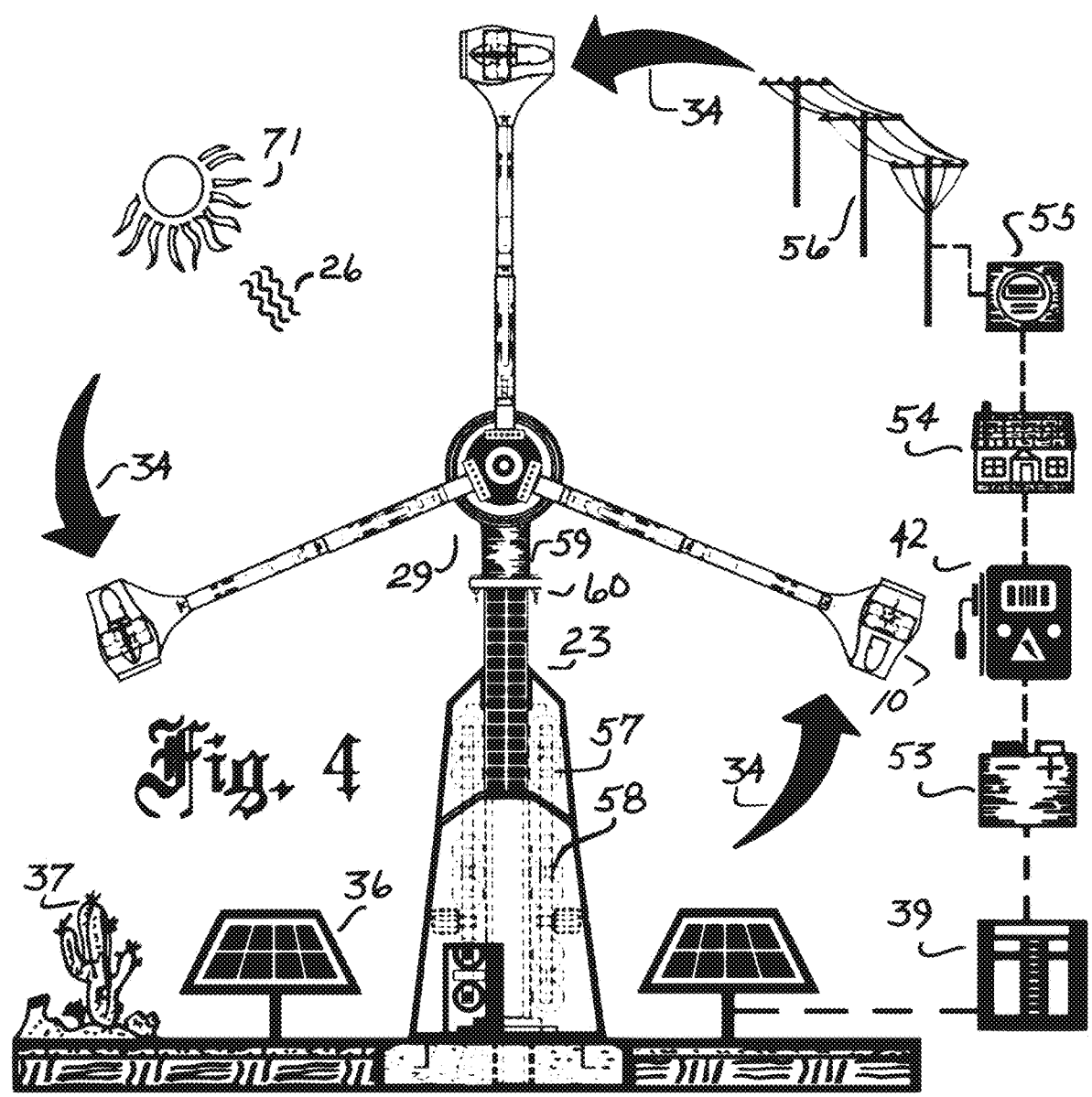
FIG. 3 Side view of extendable lever arm assembly with motor controllers
FIG. 4 Front view of the hybrid solar wind turbine with complete optimization system FIG. 5 Left-side view of the conversion kit with typical turbine housing FIG. 6 Side view of the solar wind turbine on a windy day with a typical wall section FIG. 7 Front view of the solar wind turbine on a sunny day with a typical wall section FIG. 8 Side view of the solar wind turbine in desert climate mode FIG. 9 Desert climate turbine with attached expansion rods and rotating solar disc FIG. 10 Exploded view of the desert climate turbine with attached rotating disc FIG. 11 Exploded view of the hybrid solar wind turbine FIG. 12 Solar wind turbine connected to a power distribution controller

Turning now descriptively to the drawings, similar reference characters denote elements throughout the various views. The presented figures illustrate examples of embodiments that comprise a high-speed fan system that uses low wattage to create downward thrust to propel the ducted fans which in return creates a downward force at the tips of the lever arms and extension rods.

When thrust is applied at the distal end of the arm lever, this is the applied downward force toward the extremity of the turbine arm lever(s) which pivot on a fulcrum which is stationed in the center of the internal generator. As the turbine arm(s) increase in length, a ratio correlates with the reduced amount of force needed to rotate the generator in its intended 360° circular motion.

The greater the length—larger design—of the wind turbine arm levers, the less force is required to pivot on the central fulcrum that it is positioned on. This allows the energy output of the lever(s) assisting the solar wind turbine to be increased with less applied force. The instant invention is scalable to any size due to the application within the system of compounding mechanical advantage.

The present invention's duality works with both wind and/or sun when engaging the apparatus. An advantage of the proposed system is displayed when wind patterns and conditions are not present and vice versa when sun exposure is limited in areas that receive more cloud cover and stronger wind occurrences.

FIG. 1 Exploded view of a ducted fan 10 that draws ambient air into the front of a shroud 1. A ducted fan normally has a shorter fan blade 2 than conventional propellers and is mounted within a cylindrical shroud 1. At the front of the ducted fan 10 is a cone-shaped endcap 3 which allows the air to circulate directly through the unit. The ducted fan 10 advantageously reduces losses in velocity and pressure from the tips 4 of the propeller blades by varying the cross-section of the duct. The endcap 3 is secured to the center shaft via a compression screw 5. Between the ducted fan blade 2 and the endcap 3, there is a washer 7 and a lock nut 6. The lock nut 6 is secured with a locking key 8. This locking key 8 keeps nut 6 from shifting and dislodging when the fan is operating in standard or reverse mode.

Attached to the shroud is a pitot tube 9. This tube measures the airflow velocity created as the ducted fans 10 move the blades. This pitot tube 9 is used to control the speed of the ducted fan 10. When a dangerous speed is detected in which the speed of the solar wind turbine is overly rotating, the pitot tube 9 can stop fan blade 2 from rotating in its standard forward direction to start to reverse course in the opposite direction to bring the rotational speed to proportion. This pitot tube 9—located on the exterior of the shroud of each ducted fan—in combination with on—board electronics monitors the velocity to keep the solar wind turbine from excessively spinning due to unexpected higher wind gusts that can remain constant for allotted amounts of time.

The ducted fan 10 houses a fan blade 2, an electric motor 11, a stator 43, a fan shroud 1, connecting wires 12, and a tail fin 13. The tail fin 13 directs the produced air symmetrically after passing through the ducted fan 10. It is attached with screws 14 to openings 15 that are included on the electric motor 11.

FIG. 2 Left-side view of the solar wind turbine with lever assist. The solar wind turbine with lever assist operates with wind 25 or photons 26 from the sun 71 that is absorbed by the solar cells 16 that are fixed onto the exterior of the turbine blades. Further, the combination of wind and sun 71 harvesting capabilities together will allow for maximum energy efficiency to perpetuate the circular rotation needed to produce energy output via generator 21.

Wind and photocell combinations on other hybrid turbines typically collect the sun's energy with the solar cells adding power back into the total electrical output of the entire process.

This method of energy harvesting only adds incremental amounts of electricity to the total amount of generated power. In contrast, The Solar Wind Turbine with Lever Assist as described in the instant invention, uses lesser amounts of electricity generated from the solar cells 16 needed to power the ducted fan(s) 10 themselves that are located on the extremities of the turbine blades 27.

As the turbine blades 27 rotate, attachments to the blade connectors 18 turn the shaft 19 which in return creates gyration of the planetary gears 20 inside the gearbox 28. This circular motion powers an internal generator 21 which produces electricity to be used throughout the entirety of the system. Additional shaft solar panels 23 can be fixed upon the main turbine support shaft stub 59 as well to create an even greater surface area for the harvesting of solar photons 26. The tail section 22 corrects the direction and delivers maneuverability of the wind being sought. The wind turbine cap 17 allows the airflow to be distributed amongst the blades proportionately. To finalize the contact between the upper and lower sections of the system, the shaft connector 60 completes the union between the shaft stub 59 and shaft solar panels 23.

FIG. 3 Side view of extendable lever arm assembly which consists of extendable arms that use motor controllers to extend and extract the lever.

FIG. 4 Front view of the Solar Wind Turbine with Lever Assist shown with fixed solar cells 16 and solar panels 23 with battery banks 53 used for storing additional energy that could be used if such energy is needed due to the lack of environmental conditions present to keep the system functioning at present and full capacity. Climate conditions conducive to wind and sun harvesting are the two focused methods that depend on the surrounding climate conditions for the Solar Wind Turbine with Lever Assist to operate as designed. When situated in various environments that meet the need(s) of adequate wind and sun 71, this hybrid version will qualify as a better alternative to the current systems that are already on the market today. As the sun 71 sends its photons 26 to the Solar Wind Turbine, there are key places designed on the system's various parts in which the attached solar cells 16 can absorb the sun's energy on each fixated part. These parts include but are not limited to; a plurality of turbine blades 27, the main support shaft solar panels 23, and multiple ground solar panels 36.

Turning now to the lower half of the Solar Wind Turbine with Lever Assist, notice a series of wheels 57 and pulleys 58 that allow the shaft solar panels 23 to move up, down, left, and right. As the pitot tube 9 calculates wind speed and velocity, the pulleys and wheels automatically adjust the turbine to function meeting the system's needs of the available current climate conditions. The base of the Solar Wind Turbine with Lever Assist protects and conceals all electrical instrumentation and mechanical features. Additional ground solar panels 36 harvest energy and add converted electricity to the system's battery banks 53. This furthers the system's indefinite potential of remaining operational despite the lack of surrounding environmental triggers—wind and sun—that are conducive to the primary way the system is powered. Lastly, the main shaft solar panel 23 holds the turbine securely in place, allowing it to rotate in a 360-degree rotation.

Typical wind turbine blades 27 are configured in such a way that as the wind's draft passes through the blades, it creates both lift and drag. Decreased air pressure on one side of the blade initiates the circular motion of the wind turbine blades 27. As the wind blows, the low pressure on one side of the blade pulls the blade forward. The created force of the lift is greater than the drag, causing the rotor 61 to spin.

Ideal conditions for traditional wind turbines are locations where wind fields are present or historically known. However, these standard designs have been used for decades and limit where they can be installed due to their common features.

The Solar Wind Turbine with Lever Assist comprises the basic design of a traditional wind turbine system's main components. However, the introduction of an added novel feature promoting a lever based compounded mechanical advantage allows the newly incorporated ducted fans 10 to create a downward force 31 whether the wind is present or not.

A standard lever is an arm that actuates the motion needed to lift a load or move objects by changing the input force. The Solar Wind Turbine with Lever Assist turbine blades 27 act as a lever/movable bar, fulcrum 29, and provide the turbine rotor the load 30 needed to produce electricity. The movable bar is also described as the lever. The turbine blades 27 are also expressed as a movable bar or lever. The thrust needed to facilitate the initial downward force 31 is focused on the distal tip located on the extremity of the turbine blade(s) 27.

When the ducted fans 10 are powered, they create an immediate downward force 31. This force facilitates an instant thrust on the lever(s) and begins the process of the proposed system's compounded mechanical advantage via lever assistance. When a lever meets the central fulcrum 29, this is known as its load 30. In a typical lever design, there is a constant load that has the same resistance and consistent weight distribution. The turbine arm of the presented system provides the variable load 30. The rotor 61 in combination with the electrical generator 21 is described as this system's variable load 30.

The resting place of a lever is known as the fulcrum 29. This is the midway point where the lever pivots. Since this system does not have a typical load—the design seen uses a rotor and generator 21 as its load 30, the load increases and generates electricity as the system revolves at a faster rate. This is a variable load 30 as mentioned above. Planned directly in the center of blade assembly 32 is the central fulcrum 29. This creates load 30 on each side of the encased generator 21.

The Solar Wind Turbine with Lever Assist is designed with commercial-grade ducted fans 10 added to the distal tip of each turbine blade 27. This is a novel engineering concept that can include a plurality of ducted fans 10 attached to a plurality of turbine blades 27. The ducted fans 10 are powered by fixed solar cells 16 and rotational spin of the system itself, which in return sends electricity to the power inverter 39 and onboard battery banks 53. The ducted fans power supply is not limited to primarily solar cells 16 and can use other potential energy sources—wind—that the proposed system has been designed to gather.

An additional novel feature of the proposed Solar Wind Turbine with Lever Assist concludes that the greater the extension of the turbine blades 27, the less force it will require to derive motion to start revolving the internal rotor 61. This is accomplished by the compounded mechanical advantage of lever assistance. Also, as the turbine blade(s) increases in length it will coincide with a greater surface area for additional solar cells 16 to be incorporated.

The larger the proposed system is designed, the more efficient it will become. By using compounded mechanical advantage, results will yield some of the most efficient turbines available in the world. This modern technology introduces unknown objectives in the wind turbine industry that are founded upon; ducted fan usage, compounded mechanical advantage with lever assist, unlimited scalability that allows efficiency to increase with system size, greenhouse gas reduction, and placement of the proposed system(s) in areas not typically known for strategic wind value.

The Solar Wind Turbine with Lever Assist generates electricity that converts stored DC power from the power inverter 39 into AC power. Once this electricity leaves the inverter, the energy is stored in battery banks 53 that is then transferred to a typical home via a circuit breaker box 42. Once this electricity enters the home 54, the power is monitored by a custom electric meter 55 that distributes any excess energy into the electrical grid 56.

Figure 5:
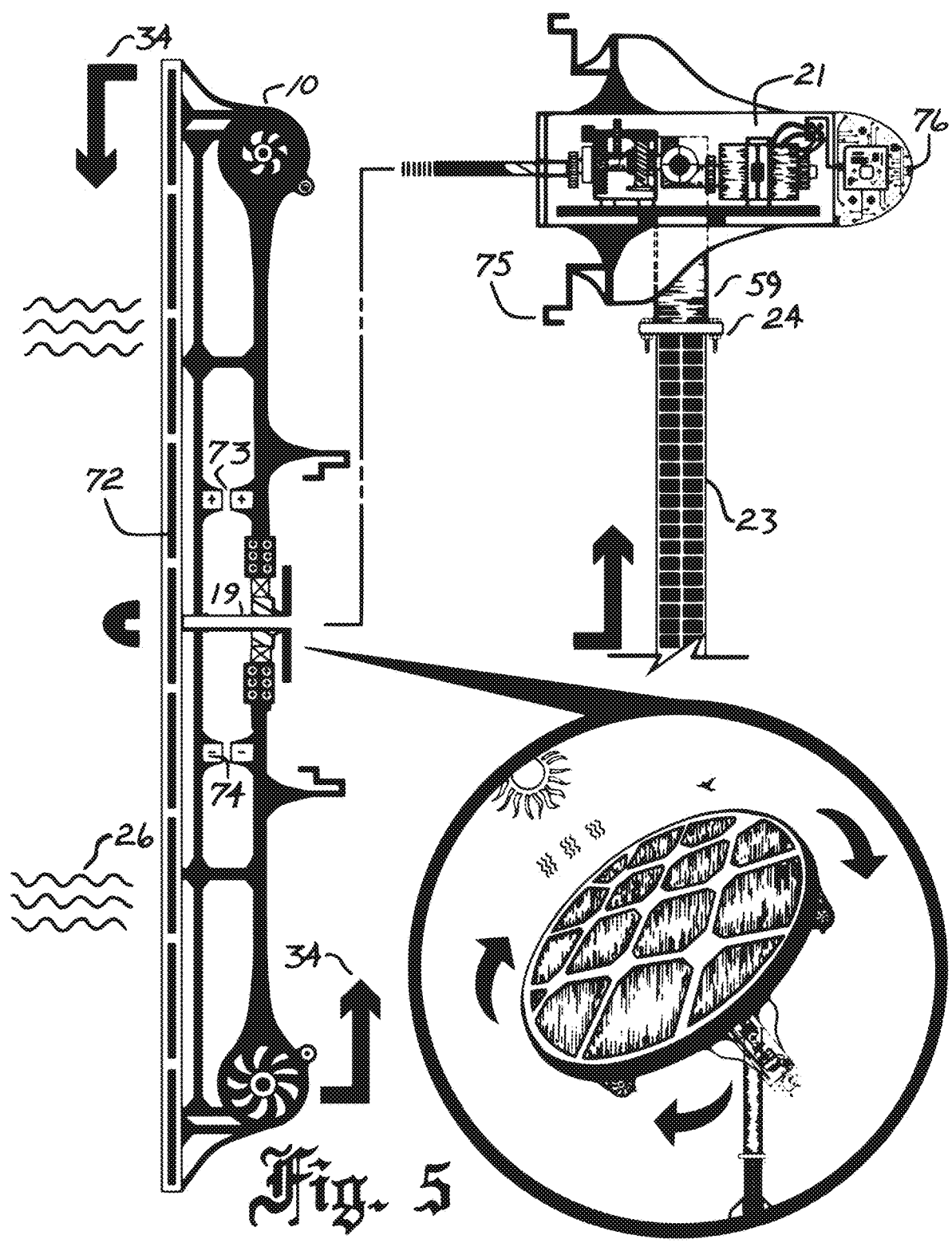

FIG. 5 Left-side view of the conversion kit with typical turbine housing. The conversion kit is a novel atypical approach that is intended to replace standard turbine blades that are conventionally known and used on current and early wind turbine models. Depicted on the left side of FIG. 5, the conversion kit is engineered to bridge the solar rotating disc 79 in association with the extension rods 77 via wireless magnetic connection 75. The conversion kit is designed to replace standard wind turbine blades by removing said blades and attaches with an updated custom blade assembly 32.

This model with lever assistance only utilizes sun 71 to rotate 34 the turbine. As the sun 71 photons 26 are absorbed through the disc solar panels 72, the electricity creates a circuit through the positive 73 and negative 74 contacts. The incremental amount of energy generated by the disc solar panels 72 powers the ducted fans 10, which starts the disc rotating 34. As the solar rotating disc 79 gyrates, there is a wireless magnetic connection 75 in which the leads do not touch to create a wireless electromagnetic induction.

This wireless magnetic connection 75 limits friction and provides the least amount of resistance as the disc spins. The onboard electronics 76 controls all functions throughout the entire system. When the solar rotating disc 79 operates, it spins the main shaft 19 while turning the generator 21. This displays the intended purpose of the proposed system which achieves the compounded mechanical advantage via application of the lever system as described in the previous drawings.

Figure 6:
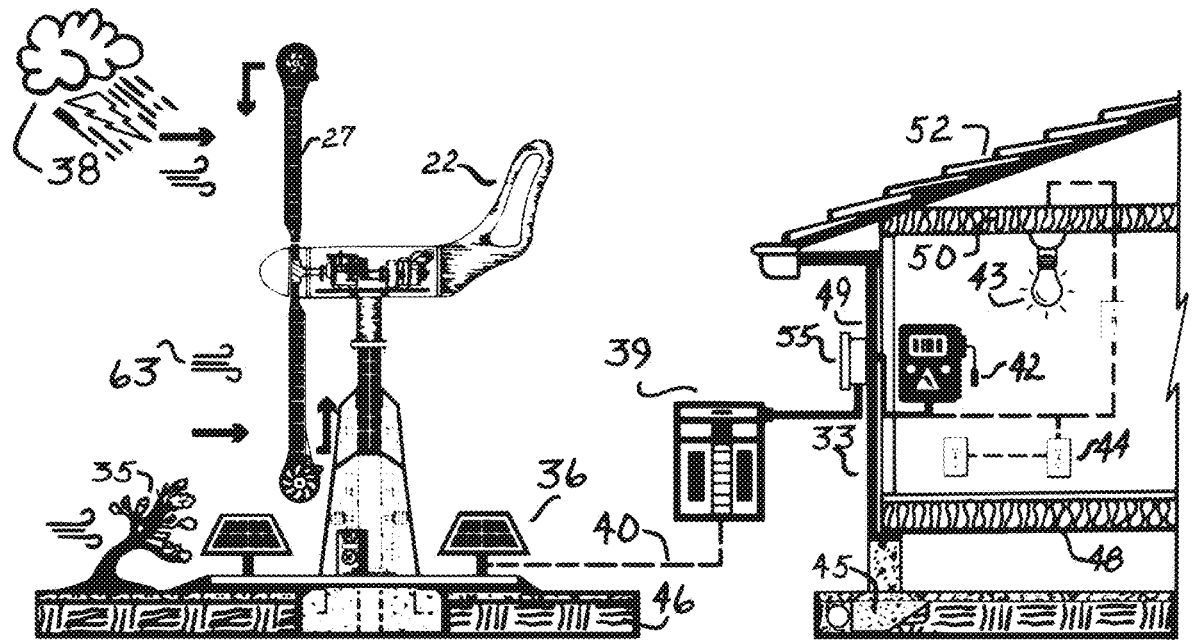

FIG. 6 Side view of the solar wind turbine on a windy day with a typical wall section of a building to the right. On the left, the system is shown on a windy 63 day with clouds, rain showers 38, and a tree 35 receiving gusts. As the wind traverses across the turbine blades 27 the turbine begins to spin.

An electrical charge creates a direct current which in return is sent into a power inverter 39 that converts the electricity into alternating current. The power cord 40 then travels to the electric meter 55 which passes the current through a section of wall 33 into the circuit breaker box 42 of the home. The completed process distributes power throughout the home via light fixture(s) 43, electrical receptacles 44, or any other source of power consumption that is used in a typical home setting.

The wall section shown in FIG. 6 is a standard building section that demonstrates how the power distribution of energy produced with the Solar Wind Turbine with Lever Assist can be compatible with any type of single or multi-family home unit(s) or commercial building. This wall section depicts the footer 45 and outside grade 46, as well as the floor joists 48, outside sheathing 49, insulation 50, and roof shingles 52.

Figure 7:
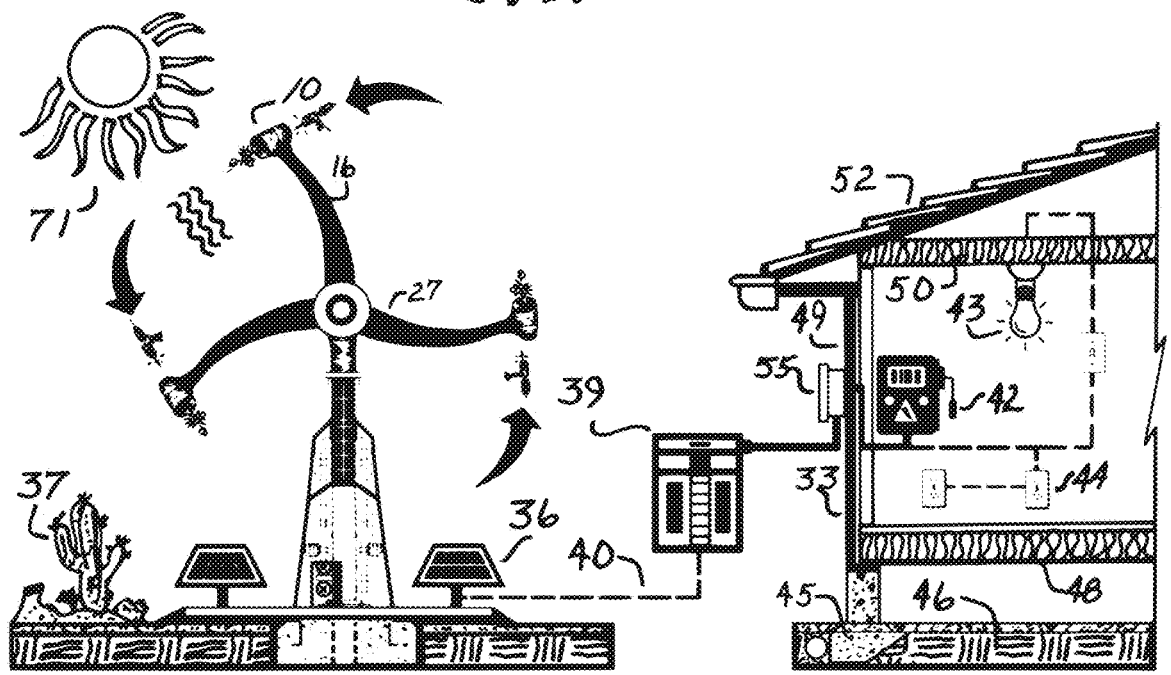

FIG. 7 Illustrates how the Solar Wind Turbine with Lever Assist can exist in a desert climate location where there are limited to periodical wind 25 fluctuations. As the sun 71 emits photons 26, the absorbed solar energy is collected on the fixed solar cells 16 that are incorporated into the turbine blades 27.

The ground solar panels 36 provide additional surface area for harvesting the sun's energy. Cactus 37 is present in this desert environment. The energy that is derived through photons 26 power the ducted fans 10. This creates the thrust needed to propel the turbine blades 27 downward and allow the generator 21 to rotate 34. This compounding mechanical advantage allows the Solar Wind Turbine with Lever Assist to operate efficiently with limited power to initiate rotation.

The wall section shown in FIG. 7 is a standard building section that demonstrates how the power distribution of energy produced with the Solar Wind Turbine with Lever Assist can be compatible with any type of single and multi-family home unit(s) or commercial buildings. This wall section depicts the footer 45 and outside grade 46, as well as the floor joists 48, outside sheathing 49, insulation 50, and roof shingles 52.

Figure 8:
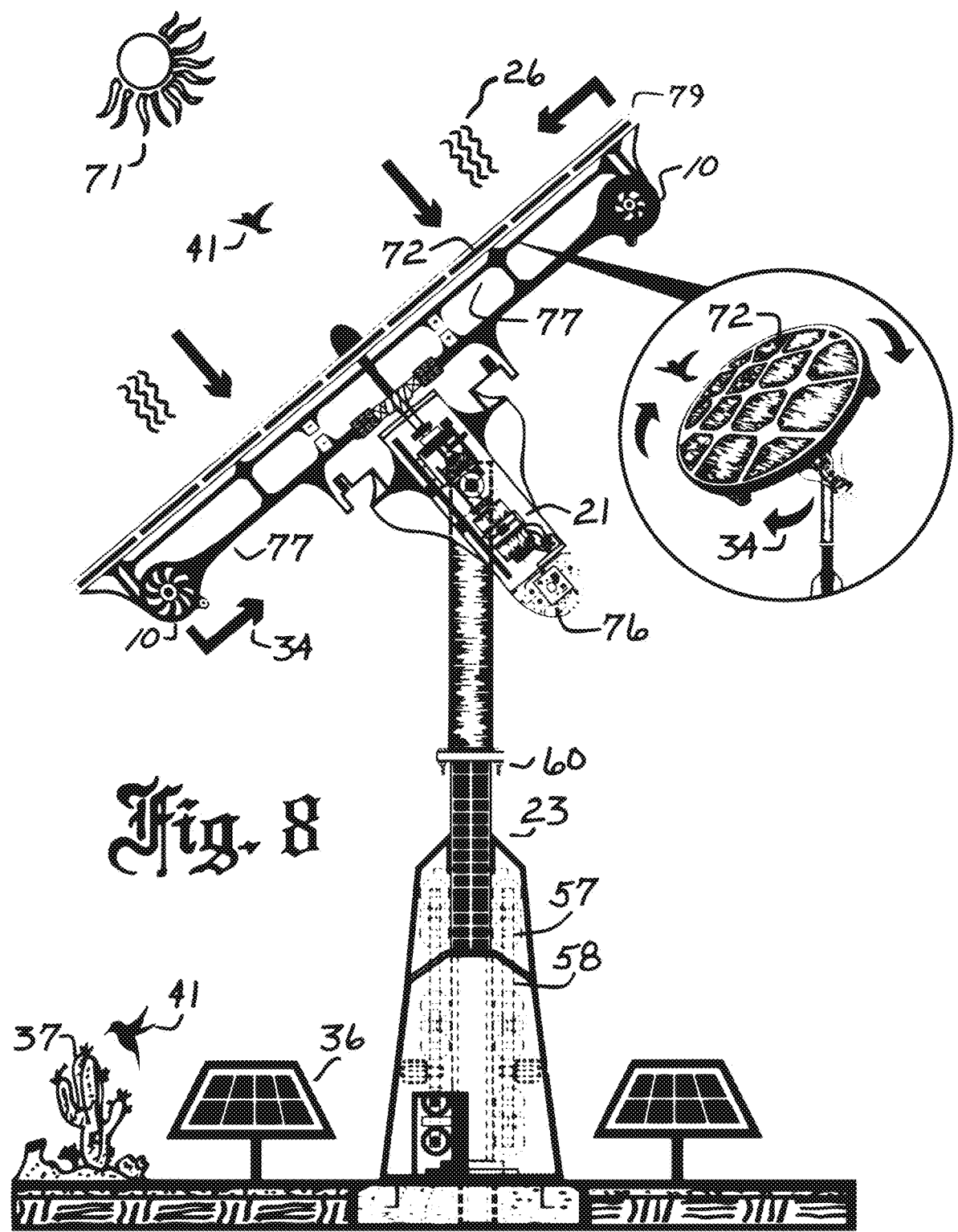

FIG. 8 Side view of the Solar Wind Turbine in desert climate mode. This system is unique and separate from the other proposed designs because the turbine is engineered without any turbine blades 27. Instead, there is in place a plurality of novel extension rods 77. The extension rods 77 encounter no resistance with the rotation of the system and are typical of having attached ducted fans 10, while structurally supporting the integrity of solar rotating disc 79 itself. As the sun 71 photons 26 are collected on the solar rotating disc 79, sufficient power is generated to initially power and operate the ducted fans 10.

As each of the ducted fans 10 performs its intended function, it allows the solar rotating disc 79 to begin its revolving motion, which in return rotates the shaft 19. Likewise, as mentioned in the above descriptions and detailed in the drawings, the complete turbine arm assembly—extension rods 77—rotate 34. The entire assembly is coupled to a shaft stub 59, which fastens to the shaft connector 60.

Beneath the shaft connector, 60 are the shaft solar panels 23 that maneuver up, down, left, and right by a series of wheels 57 and pulley 58 cooperation. The connecting shaft 19 then turns the generator 21. The onboard electronics 76 manage the entire process beginning with the initial activation of the ducted fans, and sustaining power through to the final distribution of the harvested energy in which such energy is allocated into the predetermined or needed areas of energy consumption. Note, that the Solar Wind Turbine with Lever Assist in desert climate mode is wildlife friendly.

Figure 9:
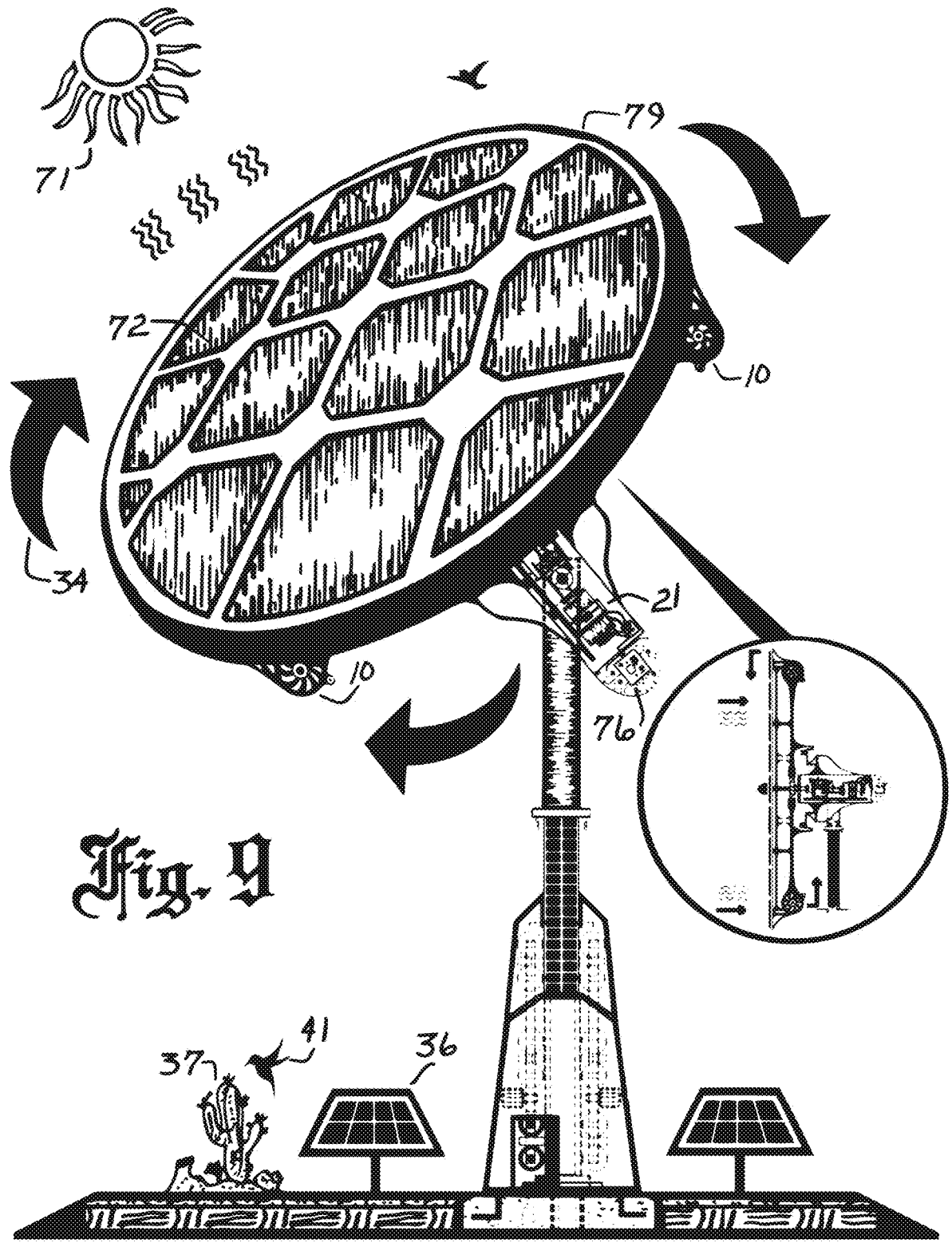

FIG. 9 Desert climate turbine with attached expansion rods and rotating solar disc highlighting the novel solar rotating disc 79 with incorporated disc solar panels 72. This depicts a clear view of the proposed concept in desert climate mode that works as explained in FIG. 8.

This model of turbine has been altered to operate without any fixed turbine blades 27. Extension rods 77 replace the turbine blades 27 with a plurality of rods used to provide structural integrity to the main surface area of the solar rotating disc 79, and the various places they are therein positioned. The extension rods 77 encounter limited resistance to the rotation of the entire assembly and are designed to include attached ducted fans 10 and support the solar rotating disc 79 with built-in disc solar panels 72.

As the photons 26 from the sun 71 are collected on the disc solar panels 72 of the solar rotating disc 79, sufficient power is generated to operate the ducted fans 10. As described in above FIG. 8, the ducted fans 10 perform their intended function to initiate a series of mechanical events that produces an output of energy to be distributed in residential, commercial, or industrial settings.

Figure 10:
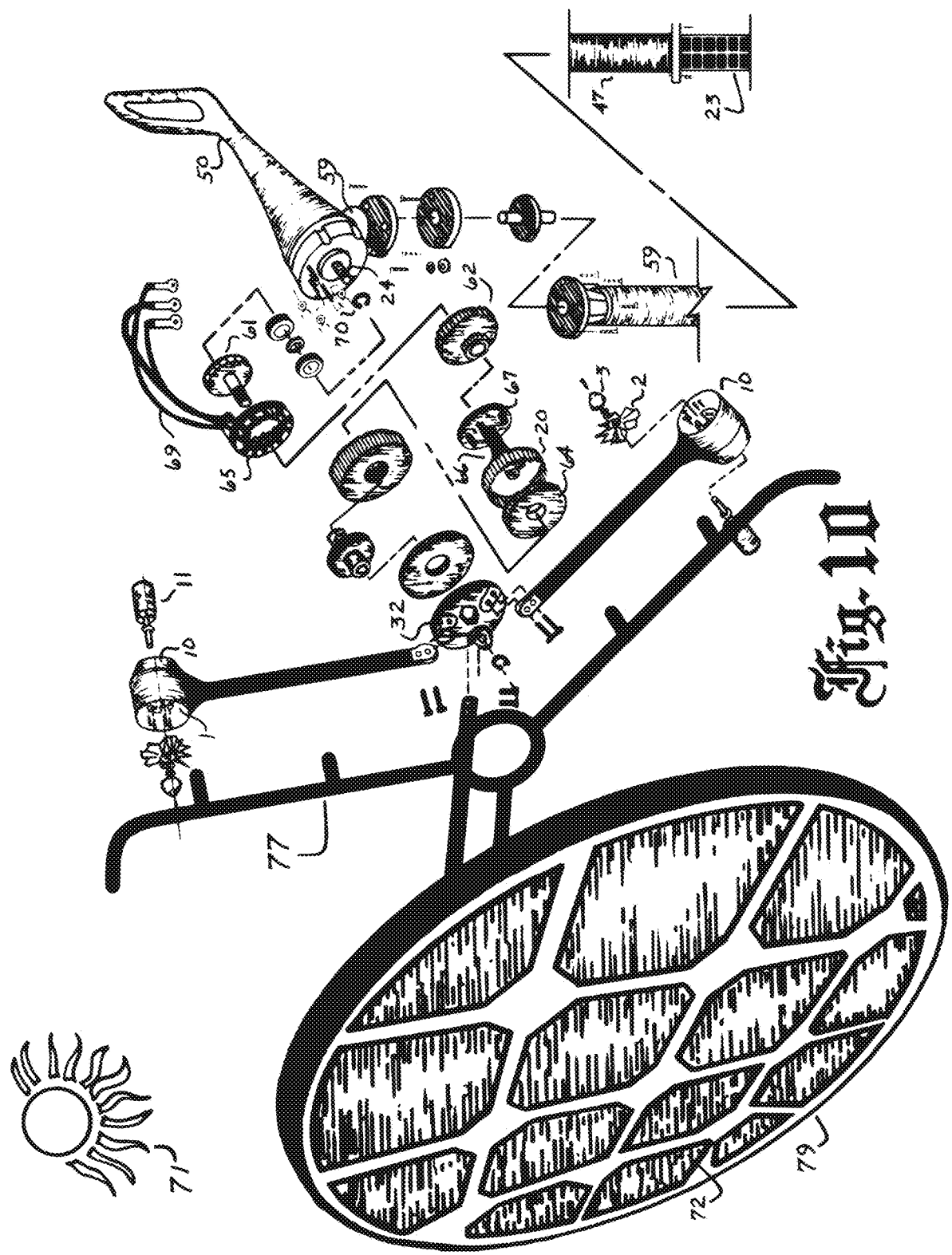

FIG. 10 Exploded view of the desert climate turbine with attached rotating assembly illustrating interior individualized parts that depict the fabrication of and fastening method needed to complete the finalized assembly. The solar rotating disc 79 contains disc solar panels 72 that are contained within its-solar rotating disc 79 perimeter.

The said disc is connected to the extension rods 77. The ducted fan 10 is powered by an electric motor 11 that turns the fan blades 2 in a shroud 1. This begins the gyration of the solar rotating disc 80. The blade assembly 32 is affixed to a series of gears 64, which is connected to its generator 21. The low-speed shaft 66 connects to gear plate 67.

The c-clamp 70 is secured to the threaded rod 24 of the tail fin 13. The tail fin 13 is appended to the shaft stub 59. Directly below the depicted shaft stub 59, there have been additional shaft solar panels 23 incorporated onto the exposed exterior surface of the main support shaft 47.

Figure 11:
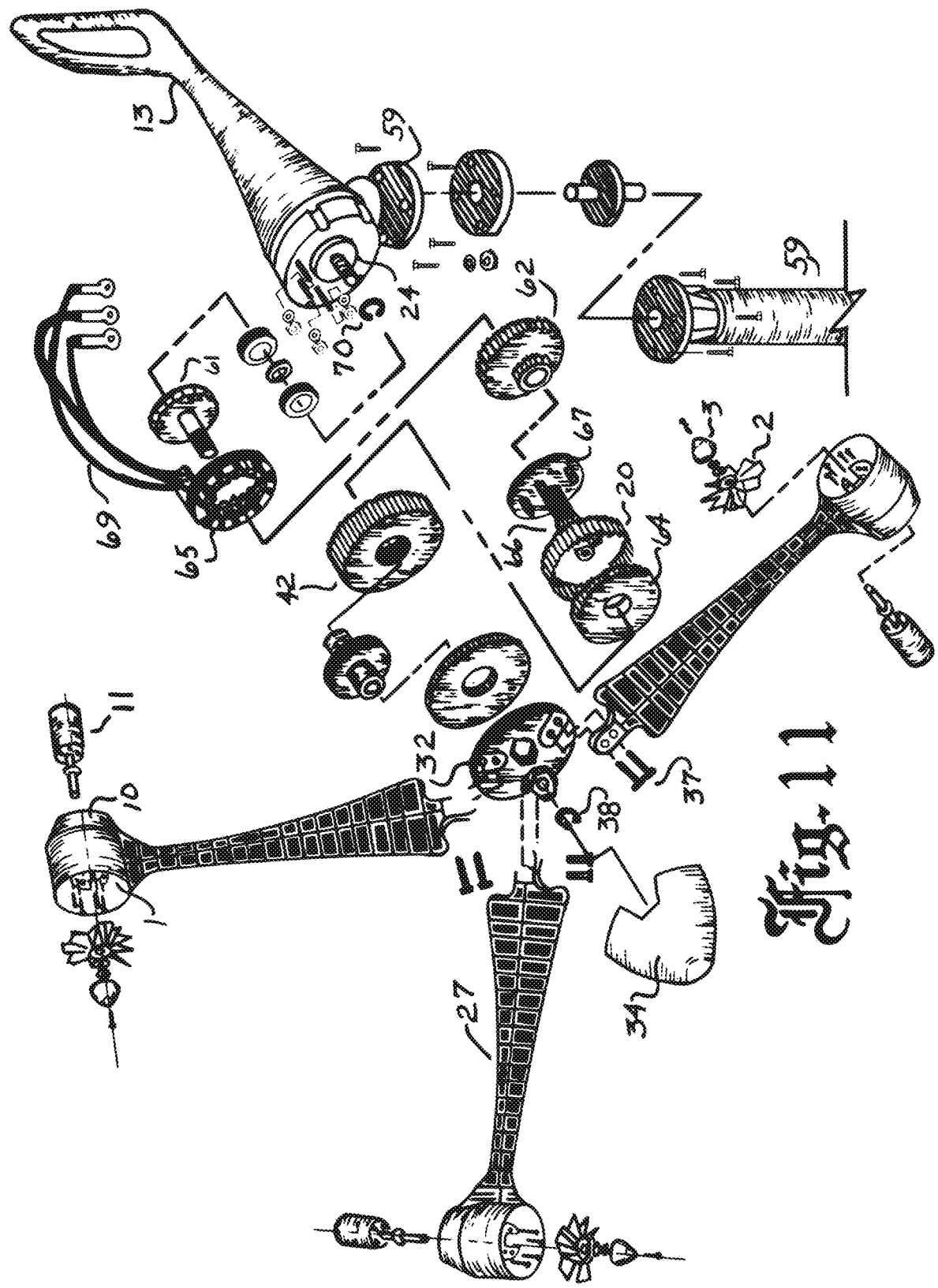

FIG. 11 Exploded view of the hybrid solar wind turbine showing interior individualized parts with traditional wind turbine arms. The traditional wind turbine arms have fixed solar panels that harvest the sun's energy to provide power to the ducted fans. The hybrid model allows this solar wind turbine to operate in environments conducive to wind and solar energy harvesting conditions.

Figure 12:
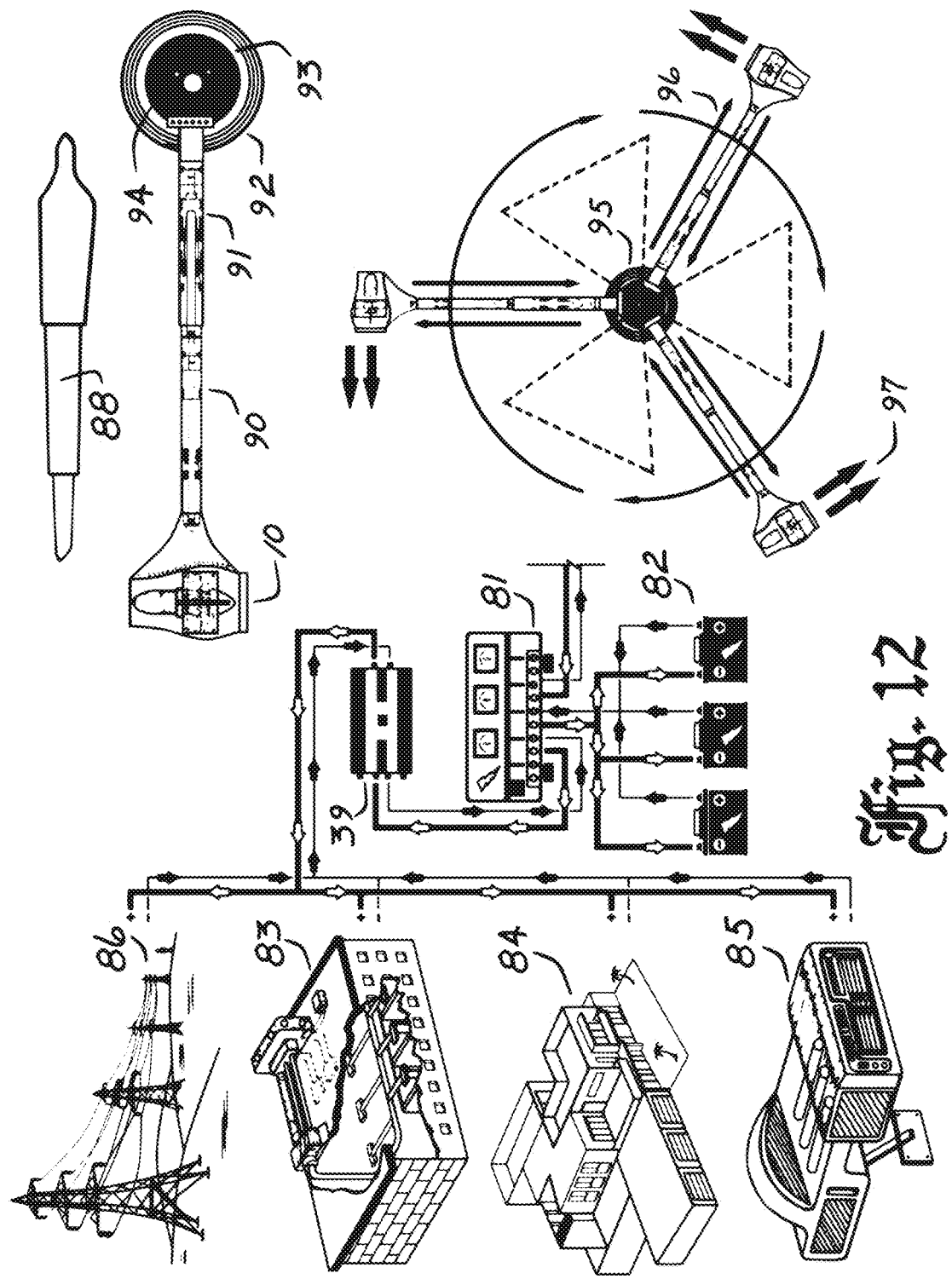

FIG. 12 Solar Wind Turbine extendable blade 88 that attaches to the extendable lever arm assembly 89. The extendable lever arm assembly 89 consists of extendable arms 90 that use motor controllers 91 to extend and extract the lever. The lever arms are attached to an electrical slipring 92 which provides electricity to the arm and ducted fan 10 by means of using a rotating metal ring with a stationary brush or magnetic levitation that transfer power to the ring. This allows electrical current to transfer from a stationary part 93 to a rotating part 94 as it turns.

The complete system 95 shows where the arrows 96 convey the motion that is to be extended and extracted. As the ducted fans 10 are turned on, it creates a downward force 97.

As the system rotates, it turns a generator and sends electricity to the power controller.

Controller 81 distributes electricity generated by the solar wind turbine directly into battery storage banks 82 for an uninterrupted power supply. Once the storage banks 82 are full, the charge controller 81 redirects the additional electric current into an A/C power inverter 39. The additional electricity is then redirected to a factory 83, home 84, or air conditioning system 85. Any excess electricity, not used by the end-user, is redirected back into the power grid 86 through a bidirectional electric meter via the power inverter 39.

The invention is not limited to the scope in this description and covers all aspects of scalable wind turbines in this preferred embodiment. Unless otherwise defined, all technical and scientific terms used herein have the same meaning as commonly understood by one of ordinary skill in the art to which this invention belongs. The instant invention may be embodied in other specific forms without departing from the spirit or essential attributes thereof and it is therefore desired that the present embodiment be considered in all respects as illustrative and not restrictive.

I claim:

1. A scalable electrical generating apparatus, comprising:
    a tower;
    a nacelle;
    a turbine cap;
    a plurality of turbine blades, wherein each of said turbine blades comprise an extendable blade arm;
    wherein a retractable motor extends and extracts each of said extendable blade arm with a respective turbine blade;
    a plurality of tilted ducted fans, wherein a connector secures each of said ducted fan to a distal end of each of said extendable blade arm;
    wherein the plurality of tilted ducted fans houses a shorter fan blade;

a velocity-sensing device comprising a pitot tube to control an overspeed of the shorter fan blade attached to a shroud of the ducted fans;

an electrical generator housed inside the nacelle;

an external solar panel power source to supply electricity to said ducted fans to create a downward torque on said ducted fans to allow activation of a compound mechanical advantage, wherein the plurality of turbine blades rotate when said ducted fans create the downward torque;

a wireless electromagnetic bridge comprising a slip ring attached to the turbine blades to allow the supply of electricity from the solar panel to travel up through the tower and the nacelle, through the slip ring, the turbine blades, and extendable blade arms to the ducted fans; and wherein the extendable blade arms act as levers that pivot on a central fulcrum, located on an axis of the electrical generator, that allows the turbine blades to rotate the electrical generator by way of said ducted fans using the compounded mechanical advantage applied to each of said extendable blade arm simultaneously.

* * * * *